US007712217B2

(12) United States Patent  
Bench et al.

(10) Patent No.: US 7,712,217 B2
(45) Date of Patent: May 11, 2010

(54) METHOD FOR DISASSEMBLING A TRANSMISSION VALVE BODY ASSEMBLY

(75) Inventors: James M. Bench, Bethany, OK (US); Glenn C. Blanton, Edmond, OK (US); Greg E. Cherry, Arcadia, OK (US); Gregory J. Jaeger, Oklahoma City, OK (US)

(73) Assignee: ATC Drivetrain, Inc., Downers Grove, IL (US)

( * ) Notice: Subject to any disclaimer, the term of this patent is extended or adjusted under 35 U.S.C. 154(b) by 1289 days.

(21) Appl. No.: 11/215,447

(22) Filed: Aug. 30, 2005

(65) Prior Publication Data

US 2007/0044305 A1    Mar. 1, 2007

(51) Int. Cl.
*B21K 1/22* (2006.01)
(52) U.S. Cl. ............... 29/888.42; 29/426.5; 29/402.03; 29/402.08
(58) Field of Classification Search ............. 29/402.03, 29/402.08, 426.1, 426.5, 888.01, 888.011, 29/888.012, 888.02, 888.021, 888.4, 888.41, 29/888.42, 888.43, 888.44, 213.1, 215, 216, 29/252, 711, 720, 721, 791; 294/64.1
See application file for complete search history.

(56) References Cited

U.S. PATENT DOCUMENTS 4,574,620 A * 3/1986 Cohl ......................... 73/47
4,787,130 A * 11/1988 Hale et al. ................. 29/213.1
5,327,646 A * 7/1994 Harmand ................. 29/888.42

* cited by examiner

*Primary Examiner*—David P Bryant
*Assistant Examiner*—Sarang Afzali
(74) *Attorney, Agent, or Firm*—David W. Carstens; Carstens & Cahoon, LLP

(57) ABSTRACT

An improved system and method for disassembling the valve body assembly of a motor vehicle transmission. Air automatically ejects the internal components of a valve body assembly sub-assembly, thereby eliminating the need for an operator to manually "beat" the sub-assembly to remove said internal components. The process of separating the upper and lower sub-assembly, and of pre-washing the sub-assembly, remain the same as in the prior art. As before, the operator manually removes the valve retainers and plugs in each sub-assembly. The operator then loads either sub-assembly onto tooling specifically designed for that sub-assembly (either upper or lower). Once started, the tooling begins an automated, pre-programmed sequence of (1) clamping the sub-assembly, (2) injecting air into specific valve ports to eject internal components causing them to be automatically ejected into parts bins specified for each valve port, and (3) releasing the sub-assembly that no longer contains any internal parts.

17 Claims, 7 Drawing Sheets

METHOD FOR DISASSEMBLING A TRANSMISSION VALVE BODY ASSEMBLY

BACKGROUND OF THE INVENTION

1. Technical Field

The present invention relates to an improved method of remanufacturing motor vehicle transmissions. Specifically, the invention relates to a system and method for using air to eject the internal components of the valve body assembly in a transmission sub-assembly.

2. Description of Related Art

The life of a motor vehicle may be extended in some instances by remanufacturing its transmission. In the case of automatic transmissions the basic remanufacturing process includes disassembly of the core, cleaning and inspection of the individual components, sub-assembly of certain components, and then final re-assembly and test.

The valve body assembly is the heart of a motor vehicle transmission. It directs fluid flow to the appropriate areas. A complete valve body assembly consists of an upper and a lower sub-assembly that are bolted together. Traditionally, disassembly of the valve body involves the following steps: (1) removing the upper sub-assembly from the lower sub-assembly; (2) pre-washing both upper and lower sub-assemblies (when the sub-assemblies are pre-washed all components remain in their respective sub-assemblies); (3) for each sub-assembly, (a) manually removing the valve retainer clips and plugs, (b) manually "beating" the sub-assembly on a work table to eject the internal components of the sub-assembly (springs, valves, etc.), and (c) using a scribe or screwdriver to pry out any components that do not eject using the "beating" method.

SUMMARY OF THE INVENTION

The present invention relates to an improved method for disassembling the valve body assembly of a motor vehicle transmission. Specifically, the present invention involves using air to automatically eject the internal components of a valve body assembly sub-assembly, thereby eliminating the need for an operator to manually "beat" the sub-assembly to remove said internal components.

The process of separating the upper and lower sub-assembly, and of pre-washing the sub-assembly, remain the same as in the prior art. Moreover, as before, the operator manually removes the valve retainers and plugs in each sub-assembly. The operator then loads either sub-assembly onto tooling specifically designed for that sub-assembly (either upper or lower). The start button for said tooling is activated, and it begins an automated, pre-programmed sequence of (1) clamping the sub-assembly, (2) injecting air into specific valve ports to eject the internal components, causing said components to be automatically ejected into parts bins specified for each valve port, and (3) releasing the sub-assembly that no longer contains any internal parts.

There are several advantages of the present invention over the prior art. Firstly, fewer repetitive motion arm injuries will result, because there is no need to "beat" the sub-assembly. Secondly, damage to the components of the sub-assembly resulting from the beating and prying required by prior art techniques is essentially eliminated. Finally, the present invention increases productivity by way of reducing variation in the disassembly process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
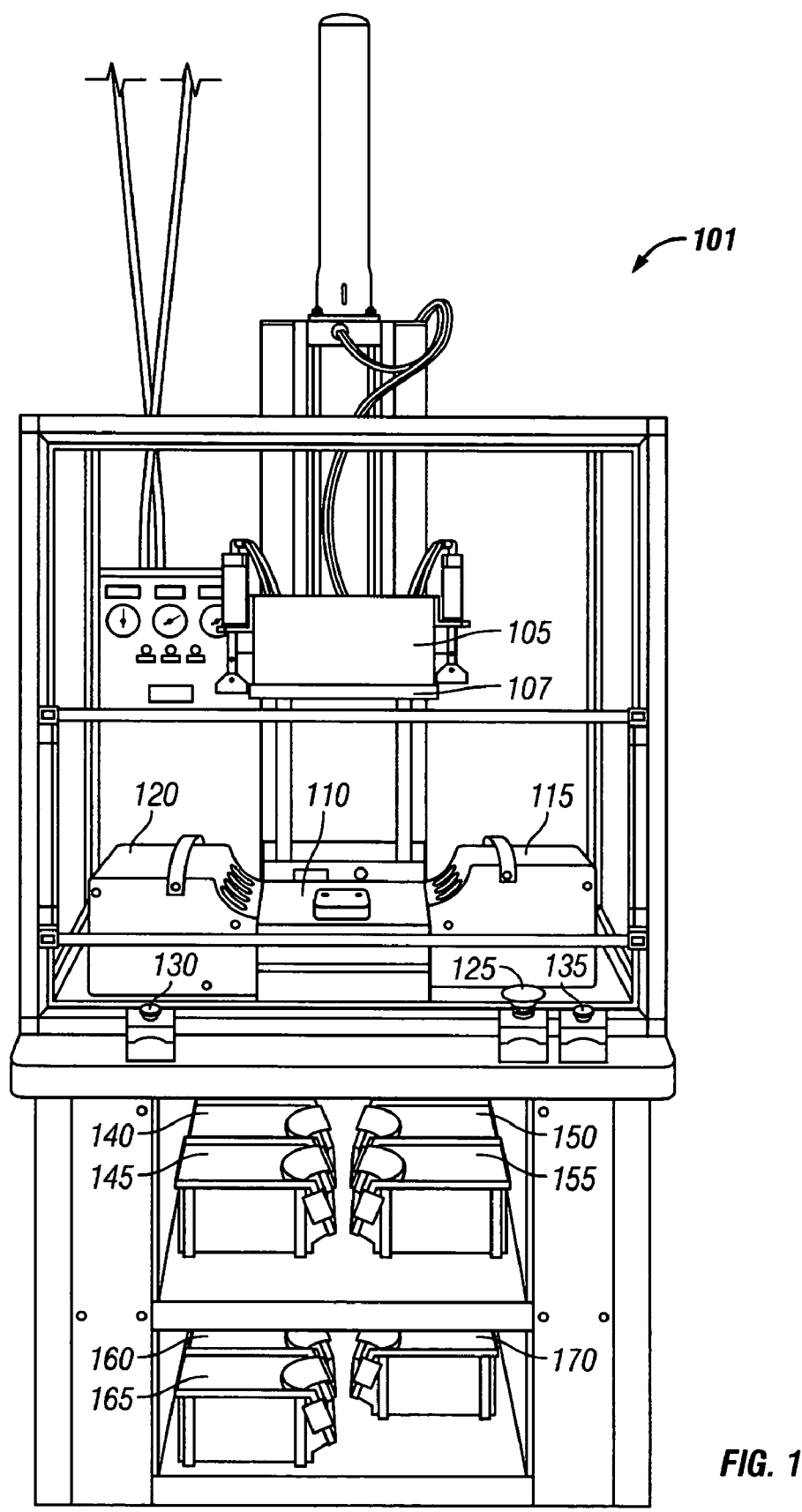
FIG. 1 is a front perspective view depicting a machine used to disassemble the valve body assembly sub-assembly of a motor vehicle transmission designed in accordance with an exemplary embodiment of the present invention.

FIG. 1 is a front perspective view depicting a machine 101 used to disassemble the valve body assembly sub-assembly of a motor vehicle transmission designed in accordance with an exemplary embodiment of the present invention. Machine 101 includes a press 105, upper plate gasket 107, lower plate gasket 110, right manifold 115, left manifold 120, emergency stop button 125, start button 130, busy light 135, and bins 140, 145, 150, 155, 160, 165 and 170. Where used in the FIGS. 1-7, the same numerals designate the same or similar parts.

Figure 2:
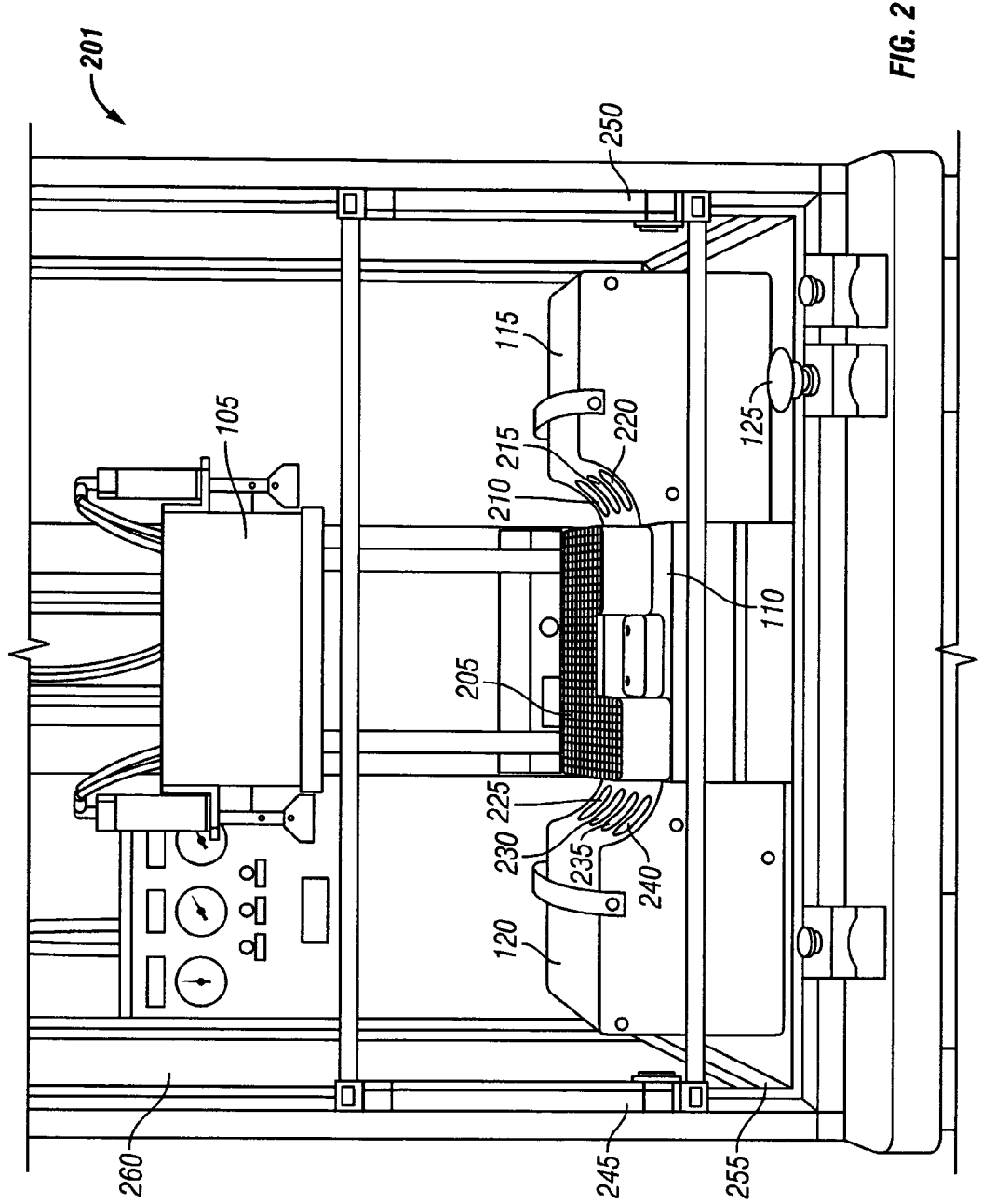
FIG. 2 is a depiction of the valve disassembly area of the machine of FIG. 1.

FIG. 2 depicts valve disassembly area 201 of machine 101 with valve body assembly sub-assembly 205 placed on lower plate gasket 110 between right manifold 115 and left manifold 120. Here, press 105 is in its upper position. Prior to sub-assembly 205 being placed on lower plate gasket 110, all retaining clips/plates and plugs are removed from sub-assembly 205. Sub-assembly 205 is placed on lower plate gasket 110 with locator pins of machine 101 engaged to the corresponding holes of sub-assembly 205, and sub-assembly 205 seated flat on lower plate gasket 110. Sub-assembly 205 is preferably clamped in position.

Right manifold 115 and left manifold 120 include manifold openings for receiving valve parts ejected by machine 101 from sub-assembly 205. Right manifold 115 has right manifold openings 210, 215, and 220. Left manifold 120 has left manifold openings 225, 230, 235, and 240.

Disassembly area 201 typically includes safety light curtain transmitter 245 and safety light curtain receiver 250 for determining whether there is a hand in the area between lower protective shield 255 and upper protective shield 260. Machine 101 will not start so long as the light curtain is interrupted or the emergency stop button is pushed. Likewise, power to machine 101 is interrupted with either the light curtain interrupted or the emergency stop button pushed. Preferably, there is a light curtain signal strength indicator on transmitter 245 and receiver 250.

Figure 3:
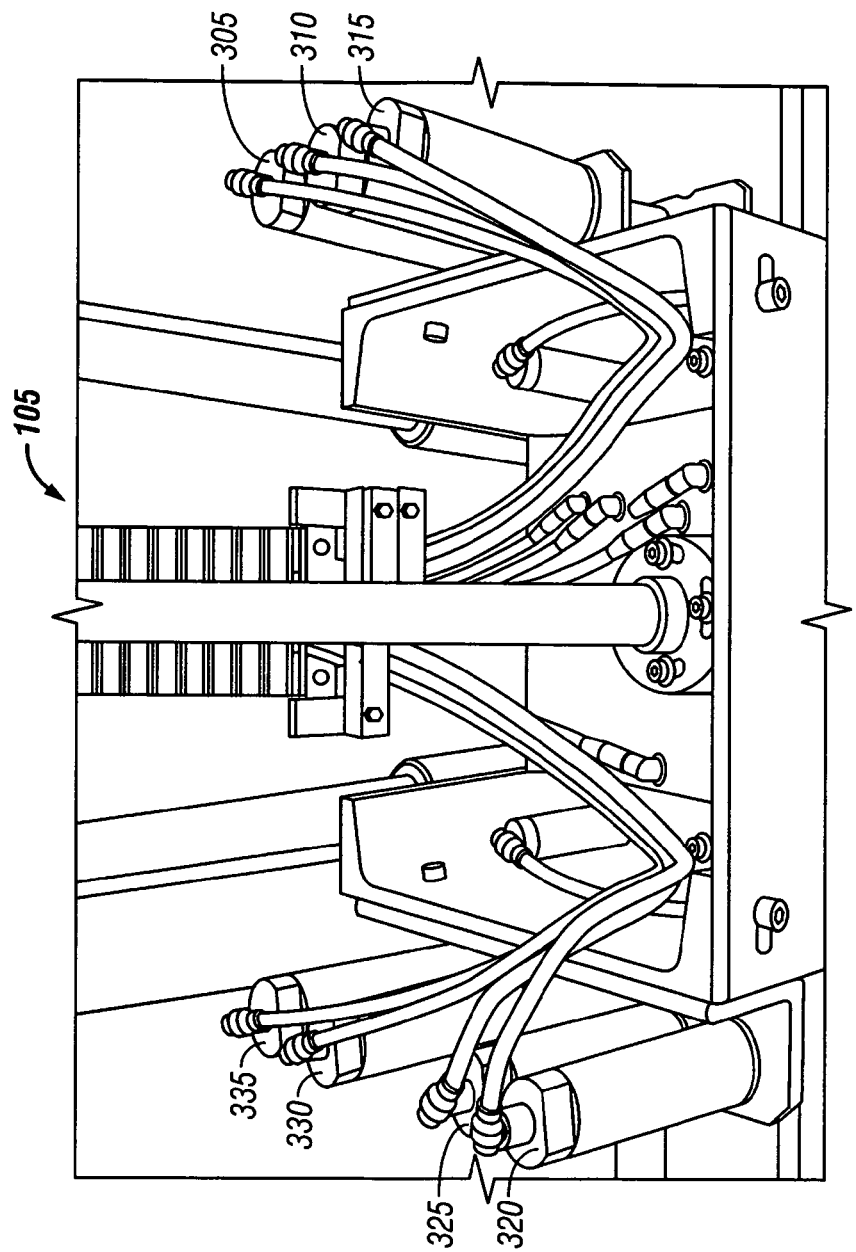
FIG. 3 is a depiction of the press of the machine of FIG. 1.
Figure 4:
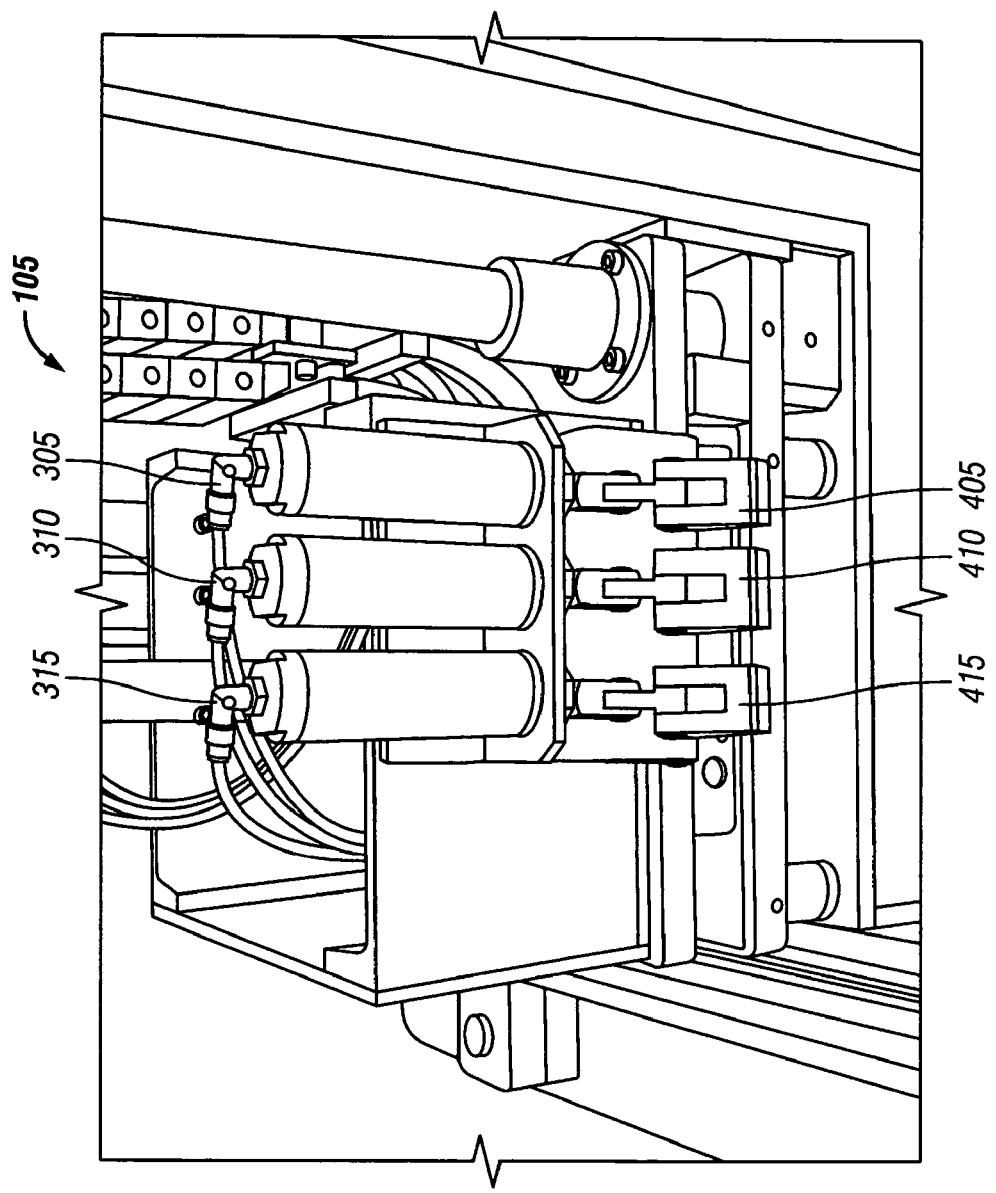
FIG. 4 is an alternative depiction of the press of the machine of FIG. 1.
Figure 5:
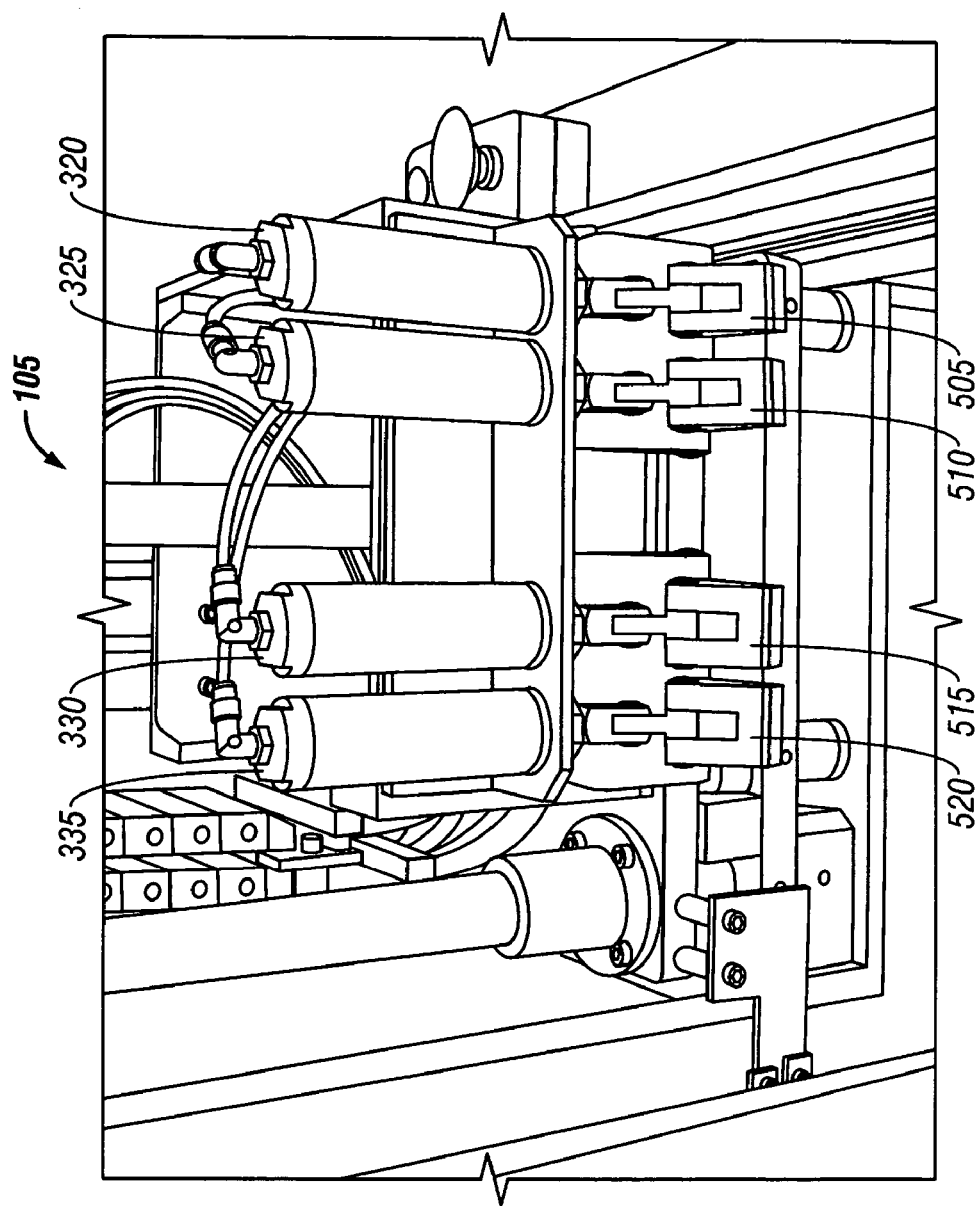
FIG. 5 is an alternative depiction of the press of the machine of FIG. 1.

FIG. 3 is a more detailed view of the upper portion of press 105. Press 105 includes air cylinders 305, 310, 315, 320, 325, 330, and 335. As shown in FIG. 4, air cylinders 305, 310, and 315 are used to operate shutters 405, 410, and 415, respectively. Likewise, as depicted in FIG. 5, air cylinders 320, 325, 330, and 335 are used to operate shutters 505, 510, 515, and 520, respectively. Each of said shutters is associated with a valve port of sub-assembly 205. Each shutter is used to manage the flow of air through its related valve port—unimpeded airflow is permitted when a shutter is in an "up" or "open" position and airflow is restricted when a shutter is in its "down" or "closed" position. Press 105 also includes air ports for sending pressurized air into valve assembly 205.

Figure 6:
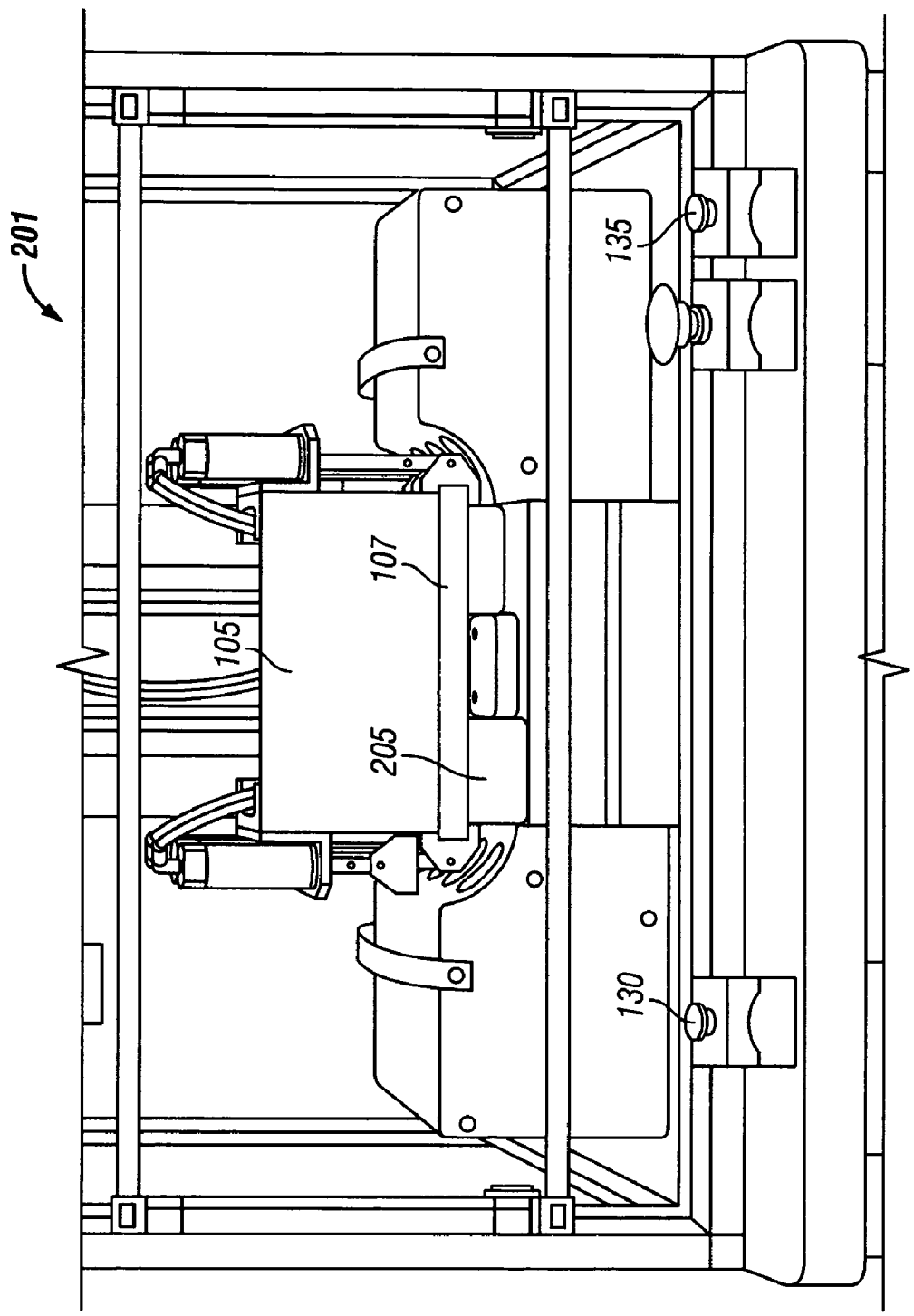
FIG. 6 is an alternative depiction of the valve disassembly area of the machine of FIG. 1 showing the upper plate gasket and sub-assembly engaged; and, FIG. 7 is a depiction of the parts-bins area of the machine of FIG. 1.
Figure 7:
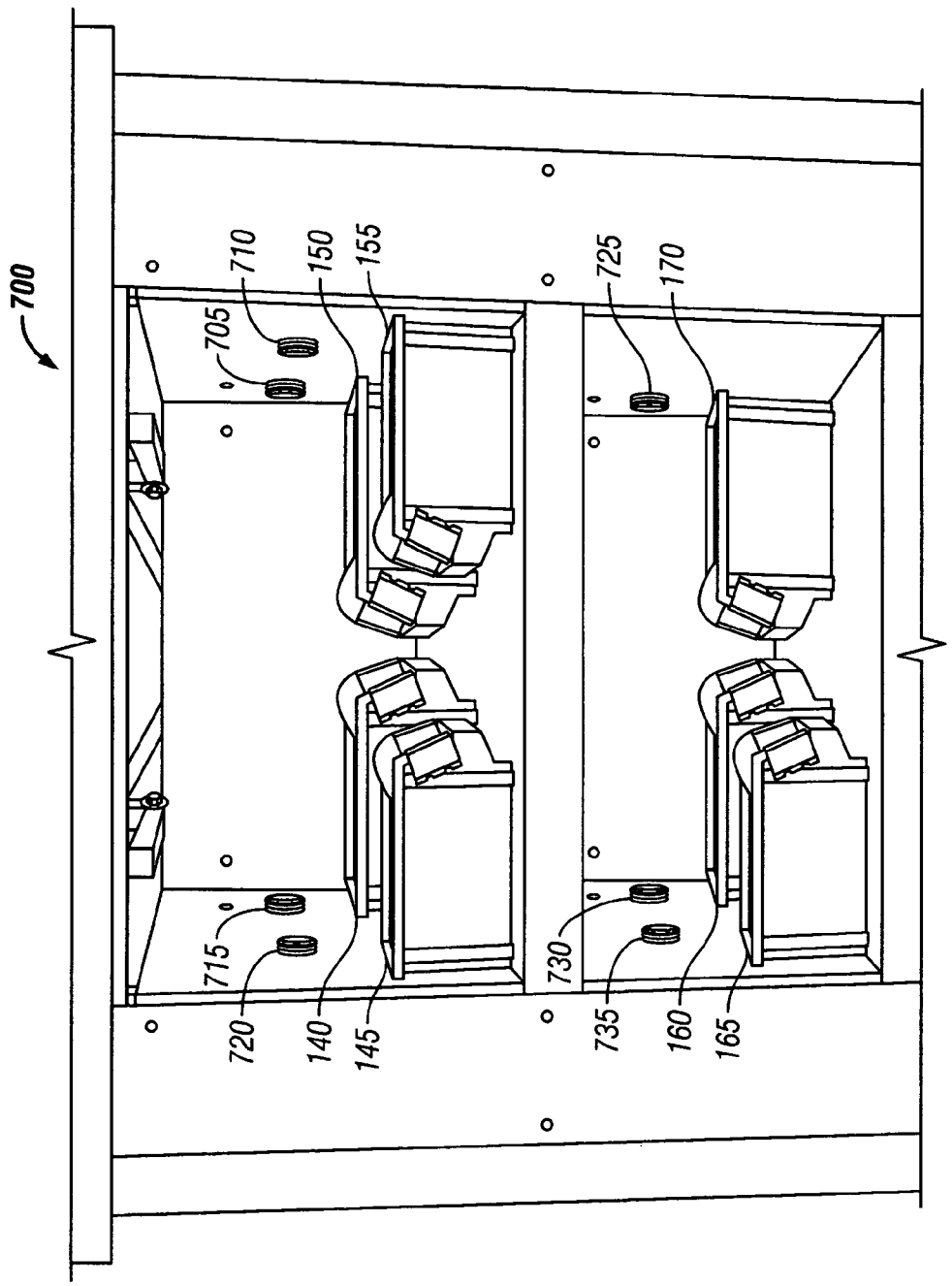

FIG. 6 is another depiction of valve disassembly area 201, showing upper plate gasket 107 for engaging sub-assembly 205 when press 105 is in its lower position. When in this configuration, upper plate gasket 107 of press 105 is engaged with the top of sub-assembly 205. When start button 130 is pressed, machine 101 starts the process of ejecting internal sub-assembly valve components at a certain sequence until all of the sub-assembly valves are cleared of components. During the machine cycle, busy light 135 will turn on.

When upper plate gasket 107 is engaged with sub-assembly 205, pressurized air injected into sub-assembly 205 by press 105 essentially can exit only through the valve ports regulated by shutters 405, 410, 415, 505, 510, 515, and 520. Preferably, only one shutter at a time is in an open position. As a result, said shutter's associated valve port is the only opening through which internal components are cleared. In other words, when all but one of the valve ports is closed, pressurized air must exit through the only unobstructed valve port, and any internal components in the path that such air must travel are ejected. For example, as depicted in FIG. 6, when upper plate gasket 107 is engaged with sub-assembly 205 such that shutters 305, 310, 315, 325, 330, and 335 are closed to block pressurized air from exiting from the respective valve ports (and shutter 320 is open), and pressurized air is injected by press 105 into sub-assembly 205, internal components are ejected from the valve port associated with shutter 320.

Internal sub-assembly valve components are ejected from sub-assembly 205 into manifold openings. Thus, internal sub-assembly valve components are ejected from the valve port associated with shutter 320 into left manifold opening 240, components are ejected from the valve port associated with shutter 315 into right manifold opening 220, and so on.

Right manifold openings 210, 215, and 220 and left manifold openings 225, 230, 235, and 240 are aligned with guide tubes for receiving ejected internal components and directing said internal components into bins 140, 145, 150, 155, 160, 165, and 170. For instance, with reference to FIG. 7, right manifold openings 210, 215, and 220 are aligned with guide tubes having guide tube exits 705, 710, and 725, respectively. Thus, internal components entering right manifold openings, 210, 215, and 220 are collected in parts bins 150, 155, and 170, respectively. Likewise, left manifold openings 225, 230, 235, and 240 are aligned with guide tubes having guide tube exits 715, 720, 730, and 735, and internal components entering said manifold openings are collected in parts bins 140, 145, 160, and 165, respectively. After machine 101 has completed the process of automatically ejecting internal components into the parts bins specified for each valve port, it releases the sub-assembly.

Machine 101 may include a programmable logic controller ("PLC"), such as Keyence's Visual KV Series (Higashi-nakajima, Osaka, Japan). Such a PLC can be used for, among other things, controlling operation of press 105, shutters 405, 410, 415, 505, 510, 515, and 520, and air ports for injecting air into sub-assembly 205.

Of course, the description of the present invention has been presented for purposes of illustration and description, but is not to be assumed to be exhaustive, nor is the invention intended to be limited to the form disclosed. Many modifications and variations will be apparent to those of ordinary skill in the art. The embodiment was chosen and described in order to best explain the principles of the invention to enable others of ordinary skill in the art to understand the invention for various embodiments with various modifications as are suited to the particular use contemplated.

We claim:

1. A method for disassembling a transmission valve body assembly comprising the step of:
    ejecting internal components of a valve body assembly sub-assembly using pressurized air injected into ports of said sub-assembly, wherein airflow through at least one valve port of said sub-assembly is obstructed by a shutter operated by an air cylinder.

2. The method according to claim 1, wherein: (a) airflow through only one valve port of said sub-assembly is unobstructed causing essentially all internal components of said valve port to be ejected only from said valve port; and (b) step (a) is repeated with a different valve port selected to be the only unobstructed valve port of said sub-assembly until all valve ports of said sub-assembly have been selected to be unobstructed.

3. The method according to claim 2, wherein obstructed valve ports of said sub-assembly are obstructed by shutters operated by air cylinders.

4. The method according to claim 3 wherein a programmable logic controller selects which valve port of said sub-assembly is to be unobstructed.

5. The method according to claim 4 wherein a safety light curtain is used while internal components are being ejected.

6. The method according to claim 1, wherein a programmable logic controller controls the process of ejecting said internal components.

7. The method according to claim 6, wherein said ejected internal components are sorted according to the valve ports from which they were ejected.

8. The method according to claim 7, wherein a safety light curtain is used while said internal components are being ejected.

9. The method according to claim 1, wherein valve ports of said sub-assembly are cleared of said internal components sequentially.

10. A method for disassembling a transmission valve body assembly comprising the step of:
    ejecting internal components of a valve body assembly sub-assembly using pressurized air injected into ports of said sub-assembly, wherein: (a) airflow through only one valve port of said sub-assembly is unobstructed causing essentially all internal components of said valve port to be ejected only from said valve port; and (b) step (a) is repeated with a different valve port selected to be the only unobstructed valve port of said sub-assembly until all valve ports of said sub-assembly have been selected to be unobstructed.

11. The method according to claim 10, wherein a programmable logic controller controls the process of ejecting said internal components.

12. The method according to claim 11, wherein said ejected internal components are sorted according to the valve ports from which they were ejected.

13. The method according to claim 12, wherein a safety light curtain is used while said internal components are being ejected.

14. The method according to claim 10, wherein obstructed valve ports of said sub-assembly are obstructed by shutters operated by air cylinders.

15. The method according to claim 14, wherein a programmable logic controller selects which valve port of said sub-assembly is to be unobstructed.

16. The method according to claim 15, wherein a safety light curtain is used while internal components are being ejected.

17. The method according to claim 10, wherein valve ports of said sub-assembly are cleared of said internal components sequentially.

* * * * *